Dec. 19, 1933.  H. W. BODENDIECK  1,940,162
METHOD AND EQUIPMENT FOR HANDLING STRAIN INSULATORS
Original Filed Jan. 5, 1928  4 Sheets-Sheet 2
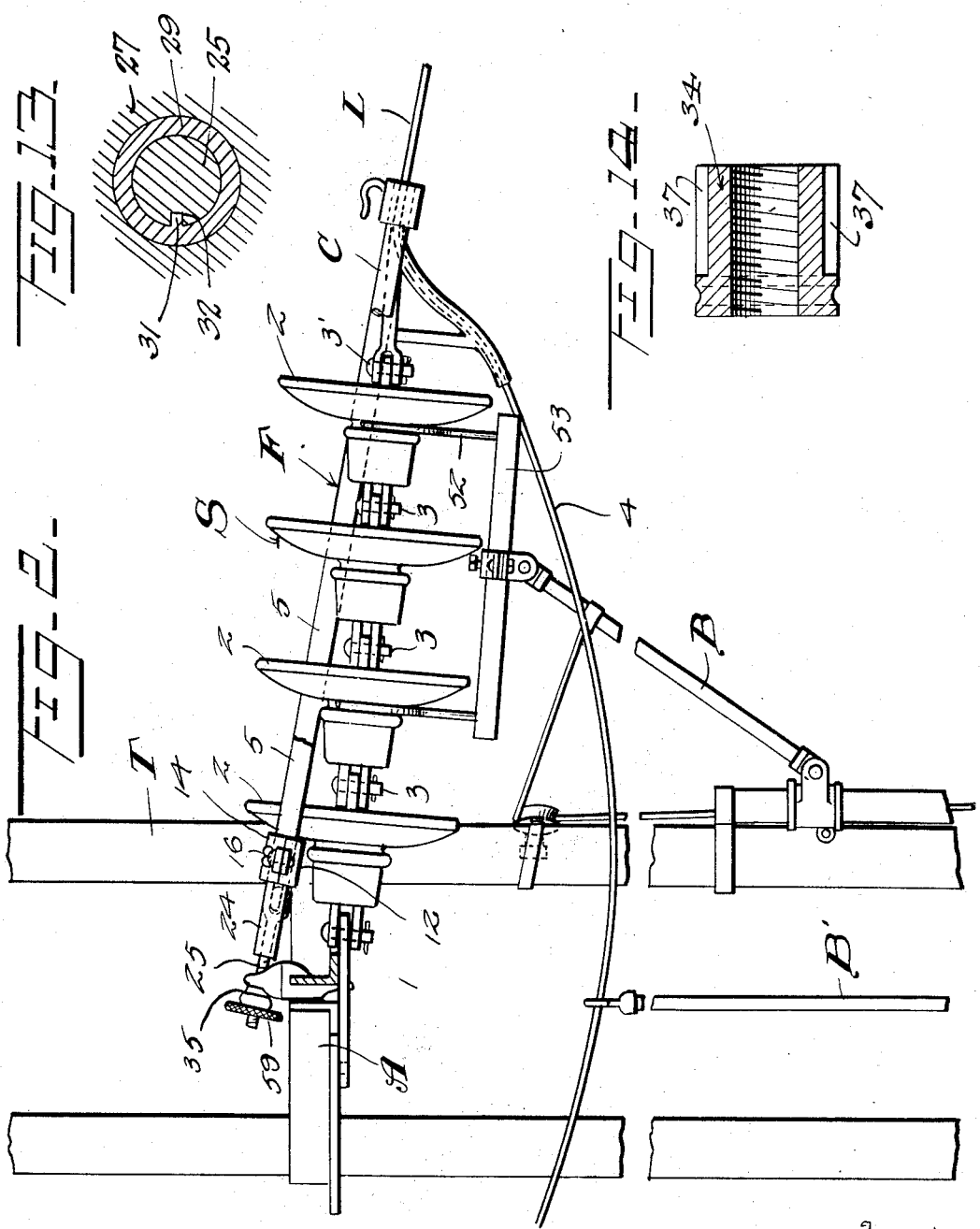
Inventor
H. W. Bodendieck
By Watson E. Coleman
Attorney Dec. 19, 1933.   H. W. BODENDIECK   1,940,162
METHOD AND EQUIPMENT FOR HANDLING STRAIN INSULATORS
Original Filed Jan. 5, 1928    4 Sheets-Sheet 3
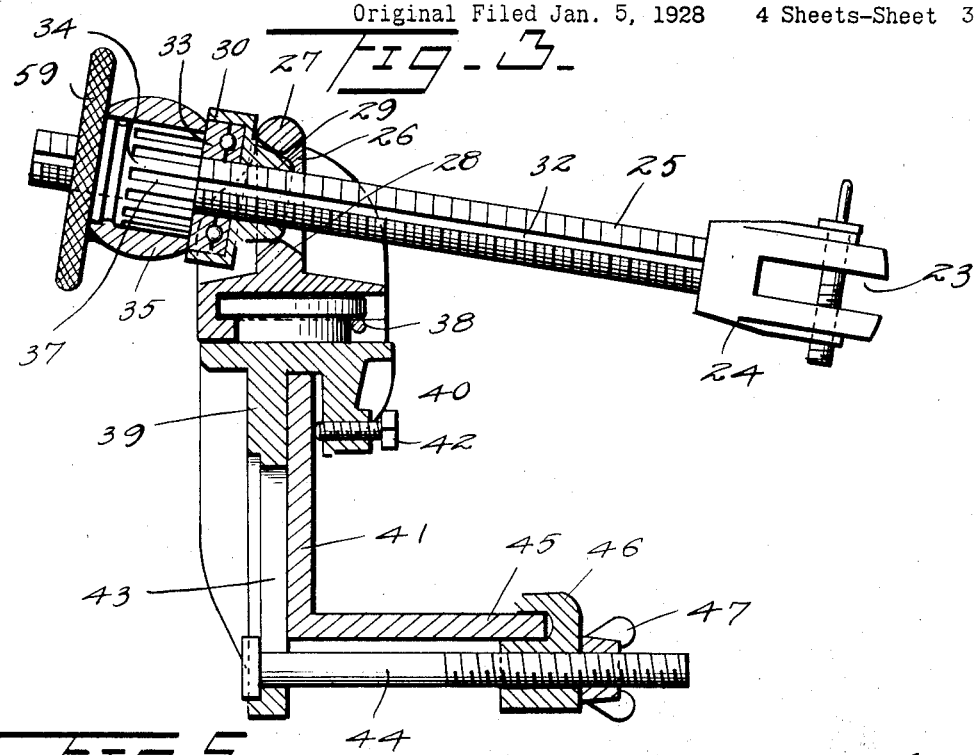
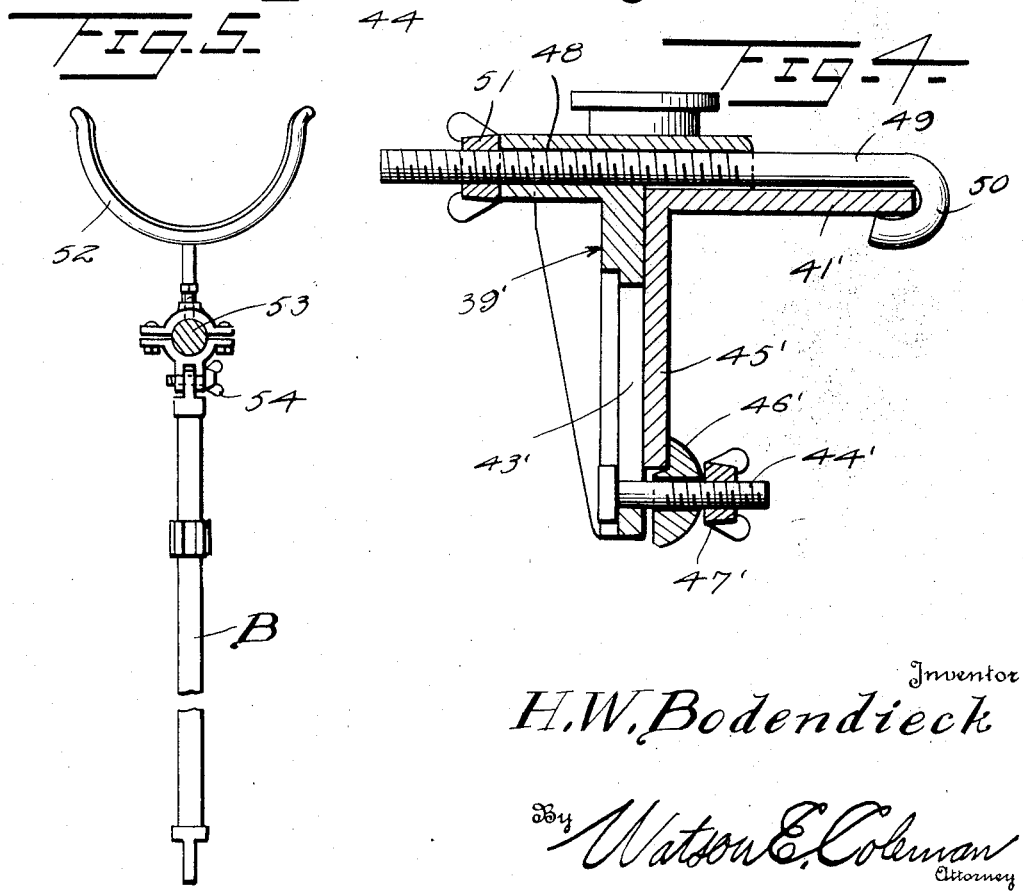
Inventor
H. W. Bodendieck
By Watson E. Coleman
Attorney Dec. 19, 1933.  H. W. BODENDIECK  1,940,162
METHOD AND EQUIPMENT FOR HANDLING STRAIN INSULATORS
Original Filed Jan. 5, 1928   4 Sheets-Sheet 4
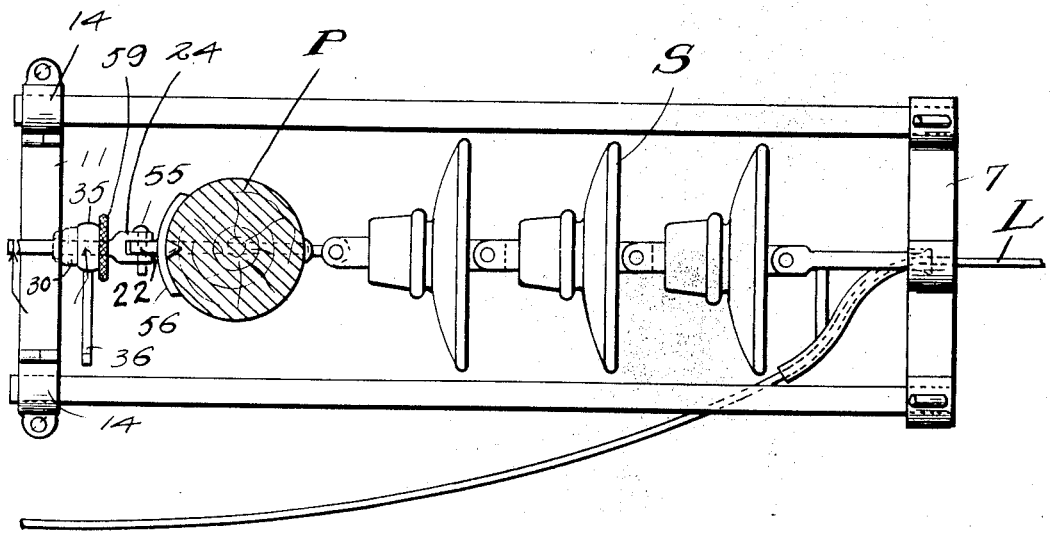
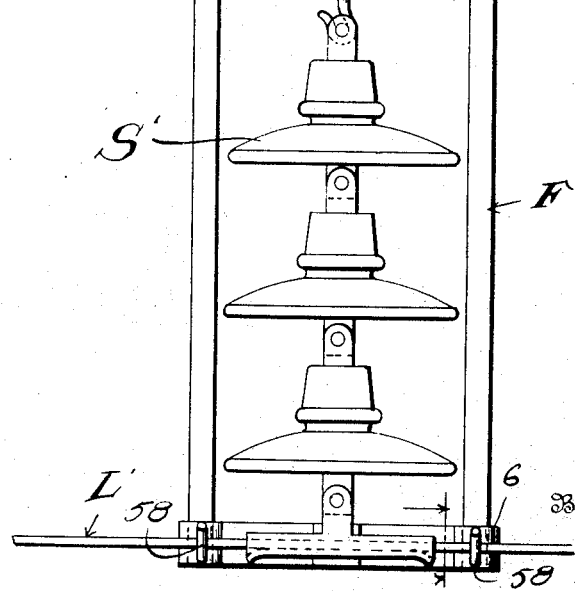
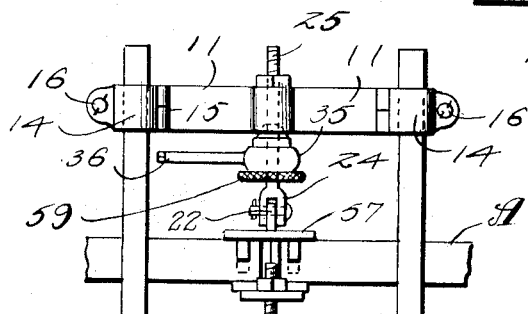
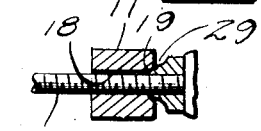
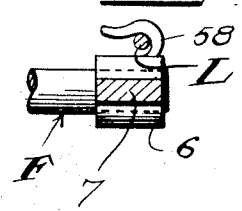
Inventor
H. W. Bodendieck
By Watson E. Coleman
Attorney Patented Dec. 19, 1933

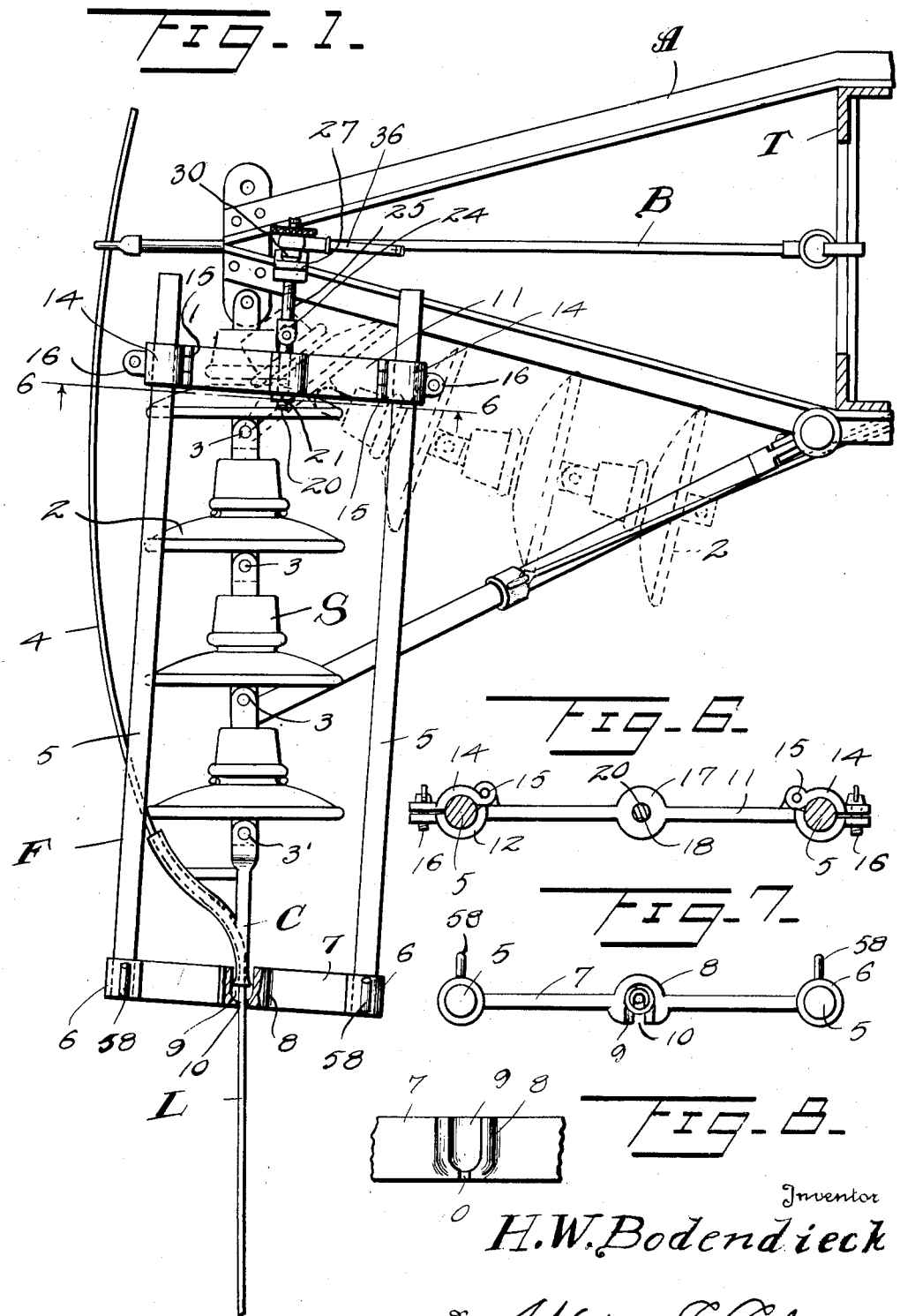

1,940,162

UNITED STATES PATENT OFFICE 1,940,162

METHOD AND EQUIPMENT FOR HANDLING STRAIN INSULATORS

Henry W. Bodendieck, Taylorville, Ill., assignor to Tips Tool Company, Inc., Taylorville, Ill., a corporation of Illinois Application January 5, 1928, Serial No. 244,760
Renewed July 18, 1931

10 Claims. (Cl. 173—251)

This invention relates to a method and equipment for handling strain insulators and it is primarily an object of the invention to provide a method and an equipment whereby a strain insulator may be connected to or disconnected from a conductor and more particularly a hot line without shutting off the current therethrough.

The invention also has for an object to provide an equipment to be used in connection with an applied strain insulator which operates in a manner to produce a slack in the insulator without effecting a break in the line or necessitating the cutting out of the line.

Another object of the invention is to provide a method and equipment of this kind which enables a lineman to conveniently and effectively handle a strain insulator when on a pole or tower and in a manner whereby the lineman is subjected to a minimum of danger especially in coming into contact with a hot line.

The invention consists in the details of construction and in the combination and arrangement of the several parts of my improved method and equipment for handling strain insulators whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in top plan illustrating a method and equipment for handling a strain insulator, a second position of the insulator being indicated by broken lines;

Figure 2 is a fragmentary view in side elevation of the assembly embodied in Figure 1;

Figure 3 is a view partly in section and partly in elevation of the operating jack as herein embodied and in applied position to the cross arm of a tower or the like;

Figure 4 is a fragmentary view partly in section and partly in elevation illustrating a further means of attaching the operating jack in applied or working position;

Figure 5 is a view partly in elevation and partly in section of the supporting arm for the insulator as herein employed;

Figure 6 is a sectional view taken through the insulator frame on substantially the line 6—6 of Figure 1;

Figure 7 is a view in elevation of the outer or forward end of the insulator yoke or frame, the coacting conductor or line being shown in section;

Figure 8 is an enlarged fragmentary view of the central portion of the forward cross bar or member of the insulator frame or yoke;

Figure 9 is a view in top plan illustrating an embodiment of my invention for use in connection with a strain insulator engaged with a pole;

Figure 10 is a fragmentary view illustrating the coaction between the jack and a cross bar or member of the insulator yoke or frame as illustrated in Figure 9;

Figure 11 is a fragmentary elevational view illustrating my equipment as herein embodied employed in connection with a suspension insulator;

Figure 12 is a fragmentary view illustrating one of the hook members as disclosed in the embodiment of my invention illustrated in Figure 11;

Figure 13 is a detailed cross sectional view particularly illustrating the key connection between the jack screw and casing;

Figure 14 is a longitudinal sectional view taken through the nut unapplied.

In the embodiment of my invention as particularly illustrated in Figures 1 and 2, A denotes a cross arm of a conventional type comprised in a tower structure T of any preferred type but of a type especially designed for use in connection with hot lines of high voltage. Operatively connected, as at 1, with the outer portion of the arm A is a strain insulator S. This insulator S is also of a conventional or well known type and comprises a plurality of similar or duplicate units 2 with adjacent units locked one to the other through the instrumentality of a coupling pin 3 or the like. The operative connection 1 hereinbefore referred to also constitutes a pin or its equivalent, it only being necessary that such pin or the like be of a type that can be readily removed or applied when the insulator S is slackened to permit said end unit to be either engaged with or disconnected from the outer portion of the arm A.

The opposite unit 2 of the insulator S is operatively connected by a removable pin 3' with a conductor clamp C of any ordinary or preferred type and with which the conductor or hot line is directly connected. While in the accompanying drawings I only show one insulator S applied, it is to be understood that there may be a corresponding insulator at the opposite side of the arm A and that in practice a jumper 4 is employed, said jumper being, if preferred, an integral part of the conductor or line L or may comprise a separate member.

Under normal line conditions the insulator S is subjected to a high degree of strain and in hot line maintenance it is essential that such insulator be released for repair or replacement without line interruption and in addition to this it is essential to provide a method and equipment for handling the strain, which will possess a maximum of safety for the lineman. The method as herein embodied for permitting the requisite manipulation of the insulator S consists in imposing or supporting the line by the tower or the like under sufficient strain to effect a slacking of an applied insulator when it is desired to remove or free such insulator and then after disconnecting the insulator from the line to swing said insulator to one side out in the clear so that it may be readily reached by the lineman for repair or replacement of such parts as may be necessary or for completely removing the insulator for substitution with another. The method for applying the insulator is substantially reverse to the method just described.

After imparting the requisite strain upon the line and to connect such line with the tower or the like when the insulator S is in operation, as herein disclosed, I employ a yoke or frame F which comprises two elongated side bars 5 of wood or other non-conductive material and each of which has one end portion engaged within a socket 6 carried by the end portion of a cross member 7 which is preferably of cast metal although any material having requisite strength may be employed. The central portion of the cross member 7 is provided with an enlarged portion 8. This portion 8 is hollow providing an inwardly facing open socket 9 the outer end of which being closed, said outer closed portion having formed therein a radially disposed open slot 10. This slot 10 permits the enlarged portion 8 to be readily engaged over the line L at a point in advance of the clamp C and as the applied member 7 is moved inwardly toward the clamp C, the outer end portion of the clamp will be readily received within the open socket 9. As particularly illustrated in Figure 8, the inner portion of the socket member is partially spherical in form so that with the clamp C partially extended within the socket 9 the clamp C and member 7 may readily have swinging movement and particularly to permit the clamp C when disengaged from the insulator S to be swung out of the way.

The inner or opposite end portions of the side bars 5 have adjustably engaged therewith the extremities of a cross member 11. The connection of the member 11 with the bars 5 may be made in any desired manner but, as herein disclosed, such connection is provided by forming each end portion of the cross member 11 with a fixed jaw 12 to engage one side portion of a bar 5, and associated with the fixed jaw 12 is a swinging jaw 14 hingedly connected, as at 15, to the adjacent end portion of the member 11 proper. The jaws 12 and 14 are tightly clamped upon an interposed bar 5 through the medium of a tightening screw 16. It is to be noted that the construction of the member 11, and more particularly the means for connecting the same to the side bars 5, readily permits said member 11 to be selectively adjusted lengthwise of the bars 5 in accordance with the length of the insulator with which the yoke or frame F is to be employed as in practice strain insulators vary.

The central portion of the member 11 is provided with an enlarged portion 17 through which is disposed an opening 18, one end portion of which being enlarged, as at 19 (in Figure 10), for a purpose to be hereinafter more particularly referred to.

In the embodiment as disclosed in Figures 1 and 2, the opening 18 has disposed therethrough a shank 20 with the inner end portion of which is engaged a nut 21 for contact with the inner face of the member 11 so that pull imposed upon the shank 20 will be imparted to the applied frame F. The outer end portion of the shank 20 is provided with an eye-member 22 which is adapted to be received within the kerf 23 of a bifurcated head 24. The head 24 is carried by an end portion of a jack screw 25. This screw 25 is of desired length and is freely disposed through an opening 26 provided in a plate 27. The wall 28 of the opening 26 is oppositely chamfered and is of a size to receive an outstanding neck 29 carried by a casing 30. The neck 29 is provided with a key 31 which engages within the groove 32 extending lengthwise of the jack screw 25 whereby the neck 29 and the casing 30 are held against rotation around the jack screw but are free to move lengthwise thereof.

The casing 30 is open at its outer end and is of a size to substantially house a thrust bearing 33 with which is adapted to directly contact a nut 34 threaded upon the screw 25. The nut 34 is arranged within a casing 35 carried by a handle 36. The handle 36 is of a conventional ratchet type and is adapted to engage within the teeth 37 provided in the periphery of the nut 34 so that when required by the operator the handle 36 may be oscillated to effect the desired turning movement of the nut 34, so that as a result of contact of the nut 34 with the thrust bearing 33 the jack screw 25 will be caused to move outwardly and through the instrumentality of the yoke or frame F to impose the desired strain or pull upon the line L until the insulator S is slackened.

The plate 27 is in swiveled connection, as at 38, with a block 39, said block 39 being provided with a fixed jaw 40 to receive an upstanding flange 41 comprised in an angle iron included in the structure of the arm A. One of the jaws 40 has threaded therethrough a clamping screw 42 for direct contact with the flange 41 to facilitate the operative connection of the block 39 with the flange 41.

The block 39 is also provided with a flange 43 through which is directed a bolt 44, said bolt 44 being of a length to extend beyond the bottom flange 45 of the angle iron. Mounted upon the outer portion of the bolt 44 is a clamping block 46 adapted to be held in working engagement with the free marginal portion of the flange 45 by the holding nut 47 threaded upon the bolt 44 as particularly illustrated in Figure 3 of the drawings.

In the event the angle iron in the arm A should have a top horizontal flange, the structure as particularly illustrated in Figure 4 is employed and wherein I employ the block 39' to which the plate 27 is adapted to be swivelly connected. This block 39' at its upper portion is provided with an opening 48 through which is disposed an elongated shank 49 provided at one end with an inwardly facing hook member 50 which is adapted to engage over the free marginal portion of the upper portion of the flange 41' of the angle iron. The opposite end portion of the shank 49 has threaded thereon the holding nut 51 coacting with the adjacent end portion of the block 39' to maintain the shank 49, or more particularly the hook thereof, in effective clamping engagement with the flange 41'. The block 39' has a part closely contacting with the vertical flange 45' of the iron and said portion has disposed therethrough a slot 43' through which is directed a bolt 44'. The bolt 44' carries a clamping block 46' maintained in clamping engagement with the flange 45' through the instrumentality of the holding nut 47' threaded upon the bolt 44'.

After sufficient pull or strain has been imposed upon the line L to slacken the insulator S sufficiently to permit the lineman to remove the coupling pin 3', said insulator is then swung to one side and to a position closely adjacent to the arm A as indicated by dotted lines in Figure 1. It is to be stated at this time that, as illustrated in Figure 1, the proportions of the arm A and the insulator and equipment are not in accordance with actual practice but have been distorted for clarity of disclosure.

Each insulator S is of considerable weight and after an insulator has been slackened a tong B carrying a plurality of forks 52 is operatively engaged with the insulator S, each of the forks 52 being directly engaged with one of the insulator units. The tong B is supported by the tower in a manner whereby said tong B may be moved upwardly or downwardly as required and swung laterally to carry the released insulator S adjacent to the arm A. The means for operating the tong B in this particular manner is not believed necessary to describe and illustrate in this application as such equipment is fully disclosed and claimed in an application for patent executed on even date herewith.

Before beginning work on the insulator S a tong B' is operatively engaged with the jumper 4 and manipulated to swing said jumper out into the clear. This tong B' may be manipulated in accordance with the disclosure contained in my application executed on even date herewith, or as comprised in my application Serial No. 167,859, filed February 12, 1927. The equipment shown in this application Serial No. 167,859 may also be employed in connection with the tong B just referred to.

After an insulator has been repaired or units replaced or the like, the same is readily returned by proper manipulation of the tong B back into position to be again coupled by the pin 3 to the clamp C. After this is done the jack screw 25 is operated to relieve the strain on the line L until the same is returned directly upon the insulator. The jumper 4 is then returned back to its normal position.

The forks 52 are suitably positioned upon an elongated bar 53 and said bar intermediate its ends is pivotally connected, as at 54, with the outer portion of the tong B, said pivotal connection being such that the bar 53 may be effectively clamped in desired adjusted position or angle with respect to the tong B. This, of course, materially facilitates the use of the tong B in connection with insulators disposed on differing angles.

The embodiment of the invention as illustrated in Figure 9 is an assembly employed for use in connection with a pole P with which an insulator S may be coupled. In this assembly the head 24 carried by the jack screw 25 is coupled by a pin 55 or the like with a plate 56 adapted to contact with the pole P at a point opposite to the insulator S and the neck 29 is engaged within the enlarged portion 19 at the inner end of the opening 18 in a cross member 11 with the jack screw 25 extending through the opening 18. Upon proper manipulation of the handle 36 stress will be imposed upon the cross member 11 resulting in requisite pull through the medium of the cross member 7 upon the line L, the method of handling the insulator S is then employed as hereinbefore explained.

In Figure 11 my equipment is arranged for use in connection with a suspension insulator S' and in this assembly a plate 57 is positioned from above on the cross arm A' and the head 24 operatively engaged therewith. The jack screw 25 extends upwardly and is operatively engaged with the cross member 11 as hereinbefore recited in connection with the embodiment of the invention as illustrated in Figure 9. The yoke or frame F in this assembly is vertically disposed and the line L' is received within the upwardly facing hook members 58 carried by the socket members 6 hereinbefore referred to so that as the frame or yoke F moves upwardly upon proper operation of the screw 25, the line L' will be raised to assure the desired slack in the insulator S'.

To facilitate an initial quick adjustment of the nut 34 with respect to the casing 30, I find it of advantage to thread upon the screw 25 a speed flange 59 which may be conveniently rotated by the lineman and whereby such rotation effects an initial quick movement of the nut 34 until it is brought into contact with the thrust bearing 33. It is to be understood, of course, that in imposing the requisite strain upon the line it is required that the handle 36 be brought into play.

With my improved method and equipment it will be readily understood from the foregoing that in handling a strain insulator or the like the slack imposed on a string of strain insulators is substantially in alignment with the original position of the insulator which is of particular advantage in connecting or disconnecting the insulator, because should the string be out of alignment it will require three or four times the amount of slack which is not at all times available due to the different sags between towers or poles.

In view of the foregoing it is believed that my improved apparatus as herein set forth is highly efficient in that in operation the shank is self-aligning with the direction of pull thus doing away with bending strain upon the shank.

From the foregoing description it is thought to be obvious that a method and an equipment for handling strain insulators constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus for imposing pull on an electric line to facilitate removal of a string insulator associated with said line comprising a pair of elongated bars arranged side by side, said bars being of a material non-conductive of electricity, cross members interposed between the bars and connecting the same at opposite end portions thereof, one of said cross members being provided with means to effect requisite engagement with the electric line for imposing pull on said line, an anchoring means, a shank carried by said anchoring means having endwise movement with respect thereto, an operative connection between said shank and the second cross member, and means for imparting endwise movement to the shank, said shank when moving endwise in one direction imposing pull upon both of the cross members and the bars and pull upon the electric line with which the first named cross member is engaged.

2. An apparatus for imposing pull on an electric line to facilitate removal of a string insulator associated with said line comprising a pair of elongated bars arranged side by side, said bars being of a material non-conductive of electricity, cross members interposed between the bars and connecting the same at opposite end portions thereof, one of said cross members being provided with means to effect requisite engagement with the electric line for imposing pull on said line, an anchoring means, a shank carried by said anchoring means having endwise movement with respect thereto, an operative connection between said shank and the second cross member, and means for imparting endwise movement to the shank, said shank when moving endwise in one direction imposing pull upon both of the cross members and the bars and pull upon the electric line with which the first named cross member is engaged, the second cross member having means to permit the same to be adjusted lengthwise of the bars and to hold said second cross member for selective adjusted position with respect to the bars.

3. In combination with a line, a wire clamp engaged with the line, an insulating member with which the clamp is engaged, a cross member provided with an opening therethrough, a portion of said opening being enlarged to provide a socket, a side portion of which is open, said cross member at the same side as the said open side of the socket being provided with a slot communicating with the remaining portion of the opening in the cross member, said slot permitting the cross member to be engaged over the line with the adjacent portion of the clamp positioned within the socket, and means for imposing pull upon the cross member, the contact of the inner end of the socket with the portion of the clamp within the socket transmitting such pull to the line.

4. In combination with a line, a wire clamp engaged with the line, an insulating member with which the clamp is engaged, a cross member provided with an opening therethrough, a portion of said opening being enlarged to provide a socket, a side portion of which is open, said cross member at the same side as the said open side of the socket being provided with a slot communicating with the remaining portion of the opening in the cross member, said slot permitting the cross member to be engaged over the line with the adjacent portion of the clamp positioned within the socket, and means for imposing pull upon the cross member, the contact of the inner end of the socket with the portion of the clamp within the socket transmitting such pull to the line, the inner end of the socket being partly spherical to permit the applied cross member and the portion of the clamp within the socket to have relative swinging movement.

5. In combination with a line, a wire clamp engaged with the line, an insulating member with which the clamp is engaged, a cross member provided with an opening therethrough, a side portion of the opening having an entrance, said entrance permitting the cross member to be engaged over the line adjacent to the clamp, and means for imposing pull upon the cross member, the contact of the cross member with the clamp transmitting such pull to the line.

6. An apparatus for imposing pull on an electric line to facilitate removal of a string of strain insulators comprising an anchoring means, a plate in swiveled connection with said anchoring means, said plate having an opening, a shank freely disposed through the opening of the plate, a casing mounted on the shank and having a part extending within the opening of the plate, said casing and shank being connected for relative movement lengthwise of the shank, a nut threaded upon the shank for coaction with the casing to move the shank in one direction, and means carried by the shank to connect the shank with the electric line.

7. An apparatus for imposing pull on an electric line to facilitate removal of a string of strain insulators comprising an anchoring means, a plate in swiveled connection with said anchoring means, said plate having an opening, a shank freely disposed through the opening of the plate, a casing mounted on the shank and having a part extending within the opening of the plate, said casing and shank being connected for relative movement lengthwise of the shank, a nut threaded upon the shank for coaction with the casing to move the shank in one direction, a thrust bearing within the casing with which the nut directly contacts, and means carried by the shank to connect the shank with the electric line.

8. An apparatus of the class described comprising an anchoring means, a plate swiveled to said anchoring means, said plate being provided with an opening, the walls of which are oppositely chamfered, a casing having an outstanding neck extending within the opening of the plate, a jack screw disposed through the casing and neck, coacting means carried by the casing, neck and jack screw for holding the jack screw against rotation independently of the casing, a nut threaded upon the screw outwardly of the casing, a thrust bearing within the casing with which the nut engages, a line engaging member, and an operative connection between the line engaging member and the jack screw whereby rotation of the jack screw in one direction imparts endwise movement to the jack screw in a direction to impose pull upon the line engaging member.

9. An apparatus for imposing pull on an electric line to facilitate removal of a string of insulators associated with said line comprising an anchoring means, a plate in swiveled connection with the anchoring means and provided with an opening, a shank freely disposed through the opening of the plate and adapted for connection with the electric line, said shank having endwise movement in a direction angular to the axis of the swivel, said shank and plate having coacting means whereby the shank has universal movement with respect to the plate, and means for imposing endwise movement upon the shank.

10. An apparatus for imposing pull on an electric line to facilitate removal of a string of insulators associated with said line comprising an anchoring means, a plate in swiveled connection with the anchoring means and provided with an opening, a shank freely disposed through the opening of the plate and adapted for connection with the electric line, said shank having endwise movement in a direction angular to the axis of the swivel, said shank and plate having coacting means whereby the shank has universal movement with respect to the plate, and means mounted on the shank and coacting with the plate for imposing endwise movement upon the shank.

HENRY W. BODENDIECK.